United States Patent

Muraoka

[15] 3,668,516

[45] June 6, 1972

[54] APPARATUS FOR INSPECTING A.C. ELECTRIC RELAY SYSTEMS DURING THE OPERATION THEREOF BY USE OF A HIGH FREQUENCY MODULATED SIGNAL

[72] Inventor: Masahide Muraoka, Tokyo, Japan
[73] Assignee: Tokyo Shibaura Electric Co., Ltd., Kawasaki-shi, Japan
[22] Filed: Feb. 5, 1970
[21] Appl. No.: 9,009

[30] Foreign Application Priority Data

Feb. 10, 1969 Japan....................................44/9485

[52] U.S. Cl..........................................324/28 R, 317/27 R
[51] Int. Cl..........................................G01r 31/02
[58] Field of Search.................324/28 R, 28 CB; 317/36 D, 317/27 R; 307/129

[56] References Cited

UNITED STATES PATENTS 3,424,958  1/1969  Groat..............................324/28 CB

FOREIGN PATENTS OR APPLICATIONS 99,638  8/1940  Sweden.............................324/28 R Primary Examiner—Rudolph V. Rolinec
Assistant Examiner—R. O. Corcoran
Attorney—Burns, Lobato & Zelnick

[57] ABSTRACT

In an apparatus for inspecting an A.C. responsive relay system during operation thereof a pulse train is provided having distinctly higher repeating frequencies than those input signals to the relay indicative of a real fault and which pulse train is modulated by A.C. voltages having frequencies and wave forms similar to those input signals for the relay indicative of a real fault. The pulse train so provided is created by mixing a pair of first and second pulse trains modulated by A.C. voltages in a pair of ring-modulators. The pulse A.C. voltages used for the modulation have distinctly higher frequencies than those of the real fault input signals for the relay. The A.C. voltages for the modulation feed the positive half waves thereof to a first multivibrator associated with one of the ring-modulators to thereby provide the first train. The A.C. voltages for the modulation, further, feed its negative half waves to a second multivibrator associated with the other ring-modulator to establish the second pulse train. Both of the multivibrators include means for regulating the respective time constants thereof whereby the pulses within the first and second pulse trains are distributed in the combined pulse train with extremely small time intervals between the resultant adjacent pulses, respectively. Thus, the combined pulse train so formed and used as the inspection signals may be easily distinguished from input signals indicative of a real fault which are applied to the relay system.

7 Claims, 7 Drawing Figures

APPARATUS FOR INSPECTING A.C. ELECTRIC RELAY SYSTEMS DURING THE OPERATION THEREOF BY USE OF A HIGH FREQUENCY MODULATED SIGNAL

BACKGROUND OF THE INVENTION

The present invention generally relates to apparatus for inspecting relay systems, and more particularly to apparatus for checking the protecting relay systems of electric power equipments, for example, electric power transmission lines, A.C. electric machines, such as A.C. power generators, synchronous motors, power transformers having a large electric capacity, and the like.

As is well known in the art, it is necessary to occasionally inspect the protective relay systems used in the electrical engineering fields. Thus for example, it is desirable to inspect the protecting relay system used; in electric power transmission lines to protect the same from any fault which may occur therein during its operation. This periodic inspection or checking will insure a successful operation of the relaying systems, without any misoperation thereof, at the instant of time in which any fault has occurred during the normal or real operation of the power transmission lines.

In such protective relay systems, such as, transmission lines there are usually employed one or any suitable combination of distance relays, directional distance relays, zero-phase over voltage relays and instantaneous fault detectable relays, such as undervoltage relays, over current relays and power flow relays, as well as transmitters and receivers for carrier protection. In order to prevent any damage to the electric power equipment, it is imperative that the respective relays in the protective systems operate without any misoperation thereof. However, often a fault may occur within the relays themselves for a long period of time. Such faults may be a breaking of a relay coil, a faulty transistor, a defect in an integrated circuit and the like.

Thus, if the protective relay system is misoperating it is impossible to remove faults which may occur in the transmission lines being protected, and as a result a failure will cause the power transmission system to assume a state of abnormal operation.

One particular inspection device for relay systems in which a usual high frequency A.C. voltage signal, distinctly different from the local commercial frequency, has been employed as the inspecting signal. Where the high frequency signal is applied to the input of the relay systems, the latter may respond to the signals in such a fashion that the relay system will function to simulate the case in which an actual fault exists, when in fact no real fault present in the relay systems. In this case, because the frequency of the inspecting signals is distinct from the commercial frequency, no interference will result therebetween and, in addition, it is possible to inspect the relay systems without having to cut off the other input signals, that is, the commercial frequency input signals to the relay systems.

In the aforementioned inspecting device, there has been employed a constant high frequency source having a relatively constant amplitude. Such a source is suitable for making a relatively simple inspection for some relay elements which are for example simply checked by the on-off states of their contacts. However, there are various complicated inspections which are required for relay elements, e.g. comparison of the phase difference between and among two or more A.C. quantities. Also, as is well known, it is sometimes required to check the functions of distance relays and directional distance relays in which the former is responsive to the distance from the installed point thereof to a failed point on the transmission lines and the latter responds to the direction of the fault presented on the lines as well as to the distance to the failed point as prescribed above. As is also well known, in the distance relay or the directional distance relay, the variations of the phase differences between the line voltages and the line currents of the transmission line are measured by the prescribed relay systems which are located near the terminal of a section of the transmission line to be protected. Any suitable output signals of the relay systems, which may be interrupted by the failed section of the transmission line, will be emitted from the relay output in the form of either mechanical on-off signals for a mechanical relay or electrical on-off output signals for a static relay where the amplitudes of the prescribed phase difference exceeds a predetermined value.

While somewhat satisfactory, one problem in the past is that it has been shown that the inspecting systems using usual high frequency signals as the inspecting signals have often resulted in insufficient results when attempting to make examinations analogous to real cases. Thus, for example, the usual high frequency signals cannot be employed for the purpose to detect a minor phase difference in the electrical angles between and among two or more A.C. electric quantities which is necessary for the distance relay systems.

In particular there are various ways in which switching transistors were employed to turn-on and turn-off within the protecting relays for transmission lines and the like. Such on-off transistors would be employed in the distance relay systems and may receive the inspection signals, each of which would periodically vary through a zero and a maximum level in accordance with the wave forms thereof. Thus, the on-off transistors would turn-on and turn-off, and then the relay systems would misoperate without taking into consideration any comparison of the phase difference between the different electric quantities.

SUMMARY OF THE INVENTION

It is therefore an object of the present invention to provide an improved apparatus for inspecting relay systems by using a pulse train which has relatively high repeating frequencies which are clearly distinct from the usual relay input signals and which pulse train is modulated by A.C. voltages having frequencies similar to those of the usual relay input signals.

In accordance with the invention it is an object to provide an inspection system for a relay in which any switching transistor thereof is not subjected to a misoperation resulting from the fact that the pulse waves in the pulse train pass through zero points every repeating cycles.

Briefly stated in accordance with a preferred embodiment of the invention there is provided at least one electrical relay system having at least two inputs to which are applied separate A.C. input signals having substantially sine wave forms respectively and at least one output which is capable of producing there from the desired results from the two input signals. There are also provided a pair of rectangular wave generators which alternatively generate repeatable pulses at the outputs thereof respectively. A pair of ringmodulators are provided in order to separately modulate both of the pulse trains from the rectangular wave generators with an alternating current at a commercial frequency which is similar to the frequency employed in the electric power systems to be protected by means of the present relay systems. The A.C. modulated pulse trains are then combined with each other to provide inspection signals analogous to the usual inputs to the relay systems. An extremely short time interval is present between the adjacent pulses in the resultant pulse train. There is also provided a low pass filter at the input of the relay to be inspected, which filter functions to pass through the usual commercial frequency signals to be conducted to the relay, but not to pass through the high frequency inspections signals which may be directed to the commercial frequency source. The input of the relay system also includes means to make the off states between adjacent pulses in the inspection signals relatively smooth.

BRIEF DESCRIPTION OF THE DRAWINGS

This invention can be more fully understood from the following detailed description when taken in connection with reference to the accompanying drawings, in which.

DETAILED DESCRIPTION OF THE PREFERRED EMBODIMENTS

Figure 1:
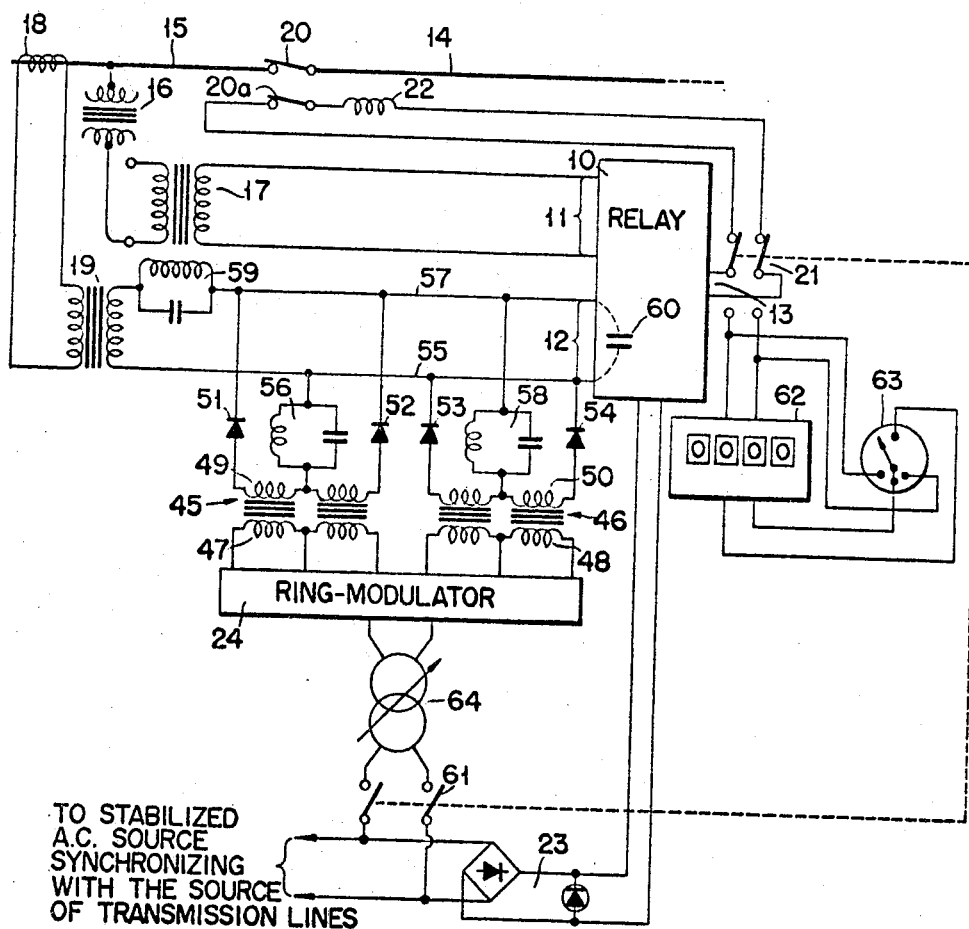
FIG. 1 is a schematic diagram of an inspection system for a relay embodying the present invention.

Referring now to FIG. 1, there is generally shown by example a directional distance relay with a reference numeral 10, and it can be assumed that the relay includes transistorized or integrated circuits having at least one switching transistor therein. The relay has a pair of inputs 11 and 12 and an output 13 one of the inputs, namely input 11, is used for receiving the system voltages and the other input namely input 12 is employed for receiving the system currents. In order to simplify the illustration, only a section of an electric power transmission line 14 to be protected by the directional distance relay 10 is shown. The input 11 of the relay 10 is connected to an end terminal 15 of the section 14 through a potential transformer 16 and an auxiliary transformer 17, and the other input 12 is also connected to the same end terminal 15 through a current transformer 18 and an auxiliary transformer 19. The section 14 has an electric power circuit breaker 20 at one end thereof for interrupting when an internal fault has occurred within the section.

As is shown, the output 13 of the relay is connected through the contacts on one side of a two-pole double throw switch or change over switch 21 to a normally open auxiliary contact 20a of the circuit breaker 20 through a trip coil 22 thereof.

Further, the transistorized circuit of the relay 10 is energized from a D.C. stabilized voltage source 23 so that the same will be ready for operation every time an accidental fault may occur in the section of the transmission lines. The D.C. source 23 is also connected to a stabilized A.C. auxiliarly voltage source (not shown), that is energized from and synchronized with the source of the transmission lines.

It should be clearly understood that such a relay and circuit breaker as described above are also provided on the other end terminal of the section 14 (not shown), whereby a fault, which may be a short circuit occurring between or among two or three phase lines of the transmission lines, is effectively removed from the section by the cooperated opening of both of the breakers which will be tripped due to the output signals of both of the relays located at both ends of the transmission lines, respectively.

Figure 2:
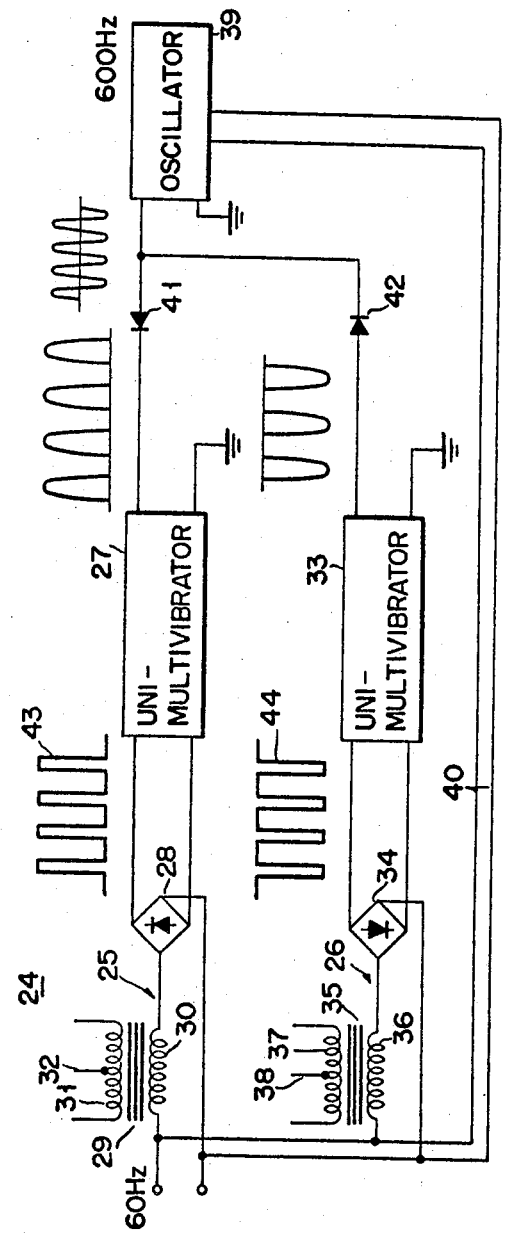
FIG. 2 shows a circuit diagram including a pair of ring-modulators and a pulse generator for use in the circuit as shown in FIG. 1.

To inspect the relay 10 when it is being energized from the transmission lines, there is provided a modulating device generally shown with reference numeral 24. As shown in FIG. 2, the modulating device includes a pair of ring-modulators 25 and 26. One of the ring-modulators 25 is composed of a uni-multivibrator 27, a single phase full wave diode rectifier 28 which is reversely biased by the output square waves of the uni-multivibrator and a transformer 29 having a primary winding 30 serially connected to the A.C. inputs of the rectifier and a secondary winding 31 with a center tap 32. Similarly, the other ring-modulator 26 comprises a uni-multivibrator 33, a single phase full wave diode rectifier 34 which is reversely biased due to the output square waves of the unimultivibrator and a transformer 35 having a primary winding 36 serially connected to the A.C inputs of the rectifier 34 and a secondary winding 37 with a center tap 38.

The series combination of the primary winding 30 and rectifier 28 and the similar combination of the primary winding 36 and rectifier 34 are connected in parallel with each other at their input terminals as shown, and then they are connected to the stabilized A.C. source (not shown) which is synchronized with the source of the transmission lines and has a frequency, for example of 60 Hz.

To commonly drive the multivibrators 27 and 33, there is provided an oscillator 39 which may generate a signal of frequency such as 600 Hz, which is ten times larger than the commercial frequency, such as, 60 Hz. The frequency of 600 Hz can be established by controlling the oscillator 39 with the commercial frequency through the conductors 40. Accordingly, in some cases, a frequency multiplier may be used for oscillator 39.

The output of the oscillator 39 is fed to the inputs of multivibrators 27 and 33 through diodes 41 and 42 which are connected with opposed conductive polarities to each other. Thus, the input signal to the multivibrator 27 include only the positive half waves in all of the output signals from the oscillator, and on the other hand, the input signals to the multivibrator 33 will include only the negative half waves in the outputs of the oscillator. It can be easily understood that there is a phase difference, which extends over 180° in electric angle, between the prescribed successive positive and negative half waves.

Thus, it can be assumed that the uni-multivibrator 27 generates an uppergoing pulse train 43 at the output thereof due to the positive input pulses, and on the other hand, the multivibrator 33 generates an undergoing pulse train 44 at the output thereof due to the negative input pulses. The uppergoing pulses in the pulse train will function the bias the D.C. output of the rectifier 28 so that the A.C. currents from the source thereof can not pass through the rectifier during the existence of the positive pulses. Similarly, the undergoing pulses in the pulse train 44 will also bias the D.C. output of the rectifier 34 to suppress the A.C. current from the source thereof which may be intended to pass through the rectifier.

Figure 3A:
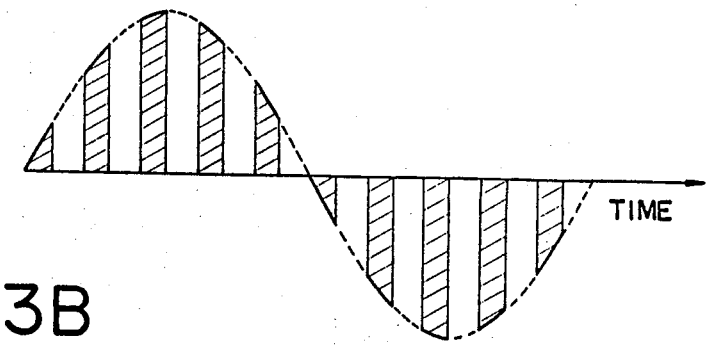
FIGS. 3A, 3B and 3C show wave forms of inspection signals for inspecting relay systems in accordance with the present invention.

In this way, as clearly shown in FIG. 3A, the A.C. currents passing through the primary winding 30 of the transformer 29 are so modulated that the hatched portions corresponding to the output pulses of the multivibrator 27 are removed from the basic A.C. currents of the commercial frequency. Similarly, it will be clearly understood in FIG. 3B that the A.C. currents flowing through the primary winding 36 of the transformer 35 will remove the hatched portions corresponding to the output pulses of the multivibrator 33 from the original A.C. currents in the commercial frequency. It will be easily understood that in the hatched portions in FIGS. 3A and 3B, the phase difference shown by the displacement of the pulses between the hatched portions will occur because of the aforesaid treatment of the output signals of the oscillator 39.

Thus, the A.C. output voltages modulated with the pulse trains are provided at the terminals of the secondary windings 31 and 37 of the transformers 29 and 35, respectively.

Referring again to FIG. 1, the output terminals of the ring-modulator 24 are then respectively fed to primary windings 47 and 48 each having a center tap, of insulating transformers 45 and 46. The output pulse trains the transformers 45 and 46 are then fed to the input 12 of the relay 10, respectively, through the secondary windings 49 and 50, each having a center tap, respectively, and diodes 51 to 54 having the polarities as shown. The center tap of the secondary winding 49 is connected to a conductor 55 through a high pass filter 56 and the center tap of the secondary winding 50 is similarly connected to another conductor 57 through another high pass filter 58. The conductors 55 and 57 are employed to feed the current signals which emanate from the transmission lines to the current input 12 of the relay 10.

The high pass filters 56 and 58 will function to easily pass pulse trains having a frequency higher than the commercial one, and will prevent A.C. currents at the commercial frequency from flowing into the ring-modulator.

There is also provided a low pass filter 59 at one of the terminals of the secondary winding of the auxiliary current transformer 19, whereby the current signals at the commercial frequency can pass through it directly to the relay input, but the inspection signals for the relay, which have frequencies higher than the commercial ones, cannot pass therethrough to the transmission line source. A decrease in the amplitude of the inspection signal will not occur.

The diodes 51 to 54 function to prevent any interferences among the pulse which respectively emanate from the halves of the secondary windings 49 and 50 of the insulating transformers 45 and 46.

Figure 3B:
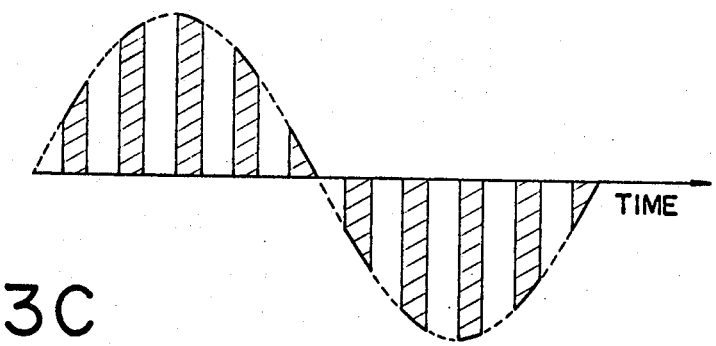
Figure 3C:
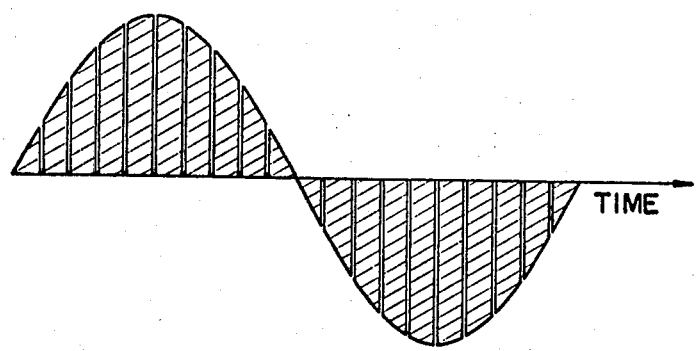

In this way, the pulse trains as shown in FIGS. 3A and 3B are mixed with each other at the current input 12 of the relay 10, whereby the inspection signals as shown in FIG. 3C are made. In this case, the width of each of the pulses emitted from the pair of ring-modulators 25 and 26 in FIG. 2 can be easily adjusted by selecting the time constants of the uni-multivibrators 27 and 33. Thus, it can be seen that an extremely short time interval is made between successive pulses within the inspection signals as shown in FIG. 3C, and accordingly the relay may respond to the non-presence of the pulses. However, an integrating device, for example a capacitor 60 having small capacitance, is connected across the relay input 12 and serves to effectively remove the prescribed defect by smoothing the valley between adjacent pulses.

To successfully transmit the pulse trains emanated from the uni-multivibrators 27 and 33 to the relay input, it is preferred that the ion cores of the transformers 29, 35, 45 and 46 be made of a low reluctance material having a high permeability, which material may be a permalloy and grain orientated silicon steel sheets.

Referring again to FIG. 1, to carry out the inspection of the relay, there is provided a switch 61 which cooperates with the change over switch 21 in order to connect the A.C. source to the ring-modulator 24 upon the inspection thereof. In addition a digital counter 62 which functions to start with the exciting of the ring-modulator and a meter relay 63 which gives an indication upon the occurrence of the output signals of the relay 10 are provided. The meter relay stops the count of the digital counter 62 upon the occurrence of the output signals of the relay 10 to thereby indicate a proper functioning of the relay 10. If no output signals occur from relay 10, then the relay 10 will obviously be functioning improperly and the counter 62 will not be stopped so that an excessive count indicative of an improperly functioning relay will occur.

It is required in order to inspect the exact operation of the relay 10, that the closing the switch 61 to force the ring-modulator 24 and the changing over of the switch 21 from the trip circuit of the circuit breaker 20 to the digital counter 62 and the meter relay 63 occur at the same time. There may be also connected a phase shifter 64 between the switch 61 and the ring-modulator 24 so as to create phase differences between the current signals and voltage signals which correspond to analogue fault conditions of the transmission lines. Thus, there will not exist any defect in the relay 10 itself, and it can generate output signals with or without a predetermined time delay corresponding to the phase difference between the input signals thereto.

For convenience of illustration, the switch 61 and the change over switch 21 employed to inspect the relay 10 are shown as being manual ones. However of course, an automatically quick reset switch like an electronics switch device may be employed for the quick inspection for the relay.

Further, for convenience of illustration, a ring-modulator has been disclosed to be excited by the auxiliary A.C. power source in synchronization with the transmission power line source. This is suited for the directional distance relay or the distance relay wherein it is necessary to make a comparison of the phase differences between two electrical quantities which may vary in response to the extent of any fault as well as the distances from the relay installed point to the failed point.

There are, however, relays wherein it is necessary only to measure the amplitudes of a single electrical quantity. Thus, for example there are relays such as an over current relay, an under voltage relay, and a zero-phase over voltage relay to detect the single line grounding of a three-phase transmission line.

Figure 4:
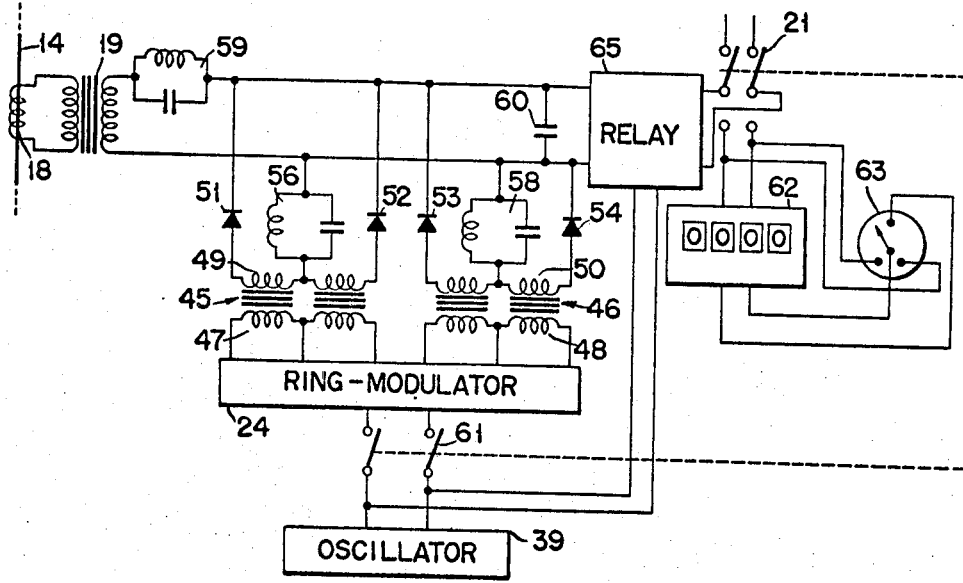
FIG. 4 is a schematic diagram of another embodiment according to the invention.

As an example of such relays, there is shown in FIG. 4 an over current relay 65 for quickly detecting the occurrence of the short circuit of a load circuit.

In the inspection system for the current relay 65, the parts which are similar to those of FIG. 1 are shown with the same reference numerals and the explanation thereof is omitted in order to simplify the illustration. As is clearly shown, the parts including the elements for measuring the voltages and the phase shifter to regulate the phase differences between two electrical quantities are removed from the components in FIG. 1. In addition, the auxiliary A.C. source which was necessary to synchronize the two kinds of input signals in FIG. 1 is also eliminated, and there is provided an oscillator, for example, a Royer's inverter or an oscillator using a uni-junction transistor for generating relatively high frequencies with respect to the commercial ones so as to be clearly distinct therefrom. The prescribed high frequency may then be employed for driving the ring-modulator as described in the embodiment of FIG. 1.

In accordance with the present invention as described above, because there is employed a resultant pulse train for inspecting relay systems in which the pulse train has distinctly higher repeating frequencies than those of the usual input signals for the relay to be examined or inspected, and which pulse train is modulated by an A.C. voltage having frequencies substantially equal to those of the aforesaid usual input signals of the relay, and in addition which resultant pulse train is established by overlapping a pair of sub-pulse trains having half frequencies of the resultant pulse train, and since the pulse occurring times of the sub-pulse trains are shifted by a single pulse so as to make a neglegible short time interval between the successive pulses respectively, it is possible to provide inspection signals for the relay which are analogically equal to the real input signals for the relay, yet the same are clearly distinct from the relay input signals. It is also possible with the present invention to provide inspection signals so that a a misoperation of relay using a transistorized or an integrated circuit for detecting any fault in the circuits to be protected by the relay which will occur. This can be achieved by adding a simple integrating memory element, for example, a capacitor having a small capacitance, across the output terminals of the inspection signal generator or the input terminals of the relay to be inspected.

Further, the inspecting device of the invention is particularly suited for the inspection of a distance relay and a directional distance relay wherein the phase comparison of two or more A.C. quantities is required, and this is effectively achieved by employing at least one phase-shiftable inspection signal synchronized with the real input signal for the relay.

The present invention is also carried out for the inspection of a relay to be employed with heavy electric machines, for example, electric power transformers, turbogenerators, water and gas turbine generators and power sources for betatrons including resonance transformers. An exemplary embodiment for the A.C. power generator is schematically shown in FIG. 5.

Figure 5:
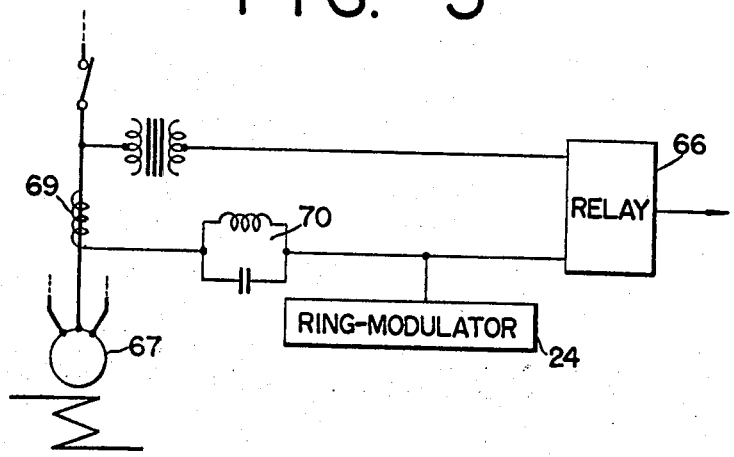
FIG. 5 is a further embodiment of the invention.

In FIG. 5, the relay 66 has a similar construction to the one shown in FIG. 1, and detects and responds to the variation of the internal impedance of the alternator upon the occurrence of faults therein through a potential transformer 68 and a current transformer 69. There is also provided a low pass filter 70 connected between the terminals of the secondary winding of the current transformer 69 and the current input of the relay 66, and a ring-modulator 71 as described above is connected between the low pass filter and the current input of the relay.

Obviously, numerous modifications and variations of the present invention are possible in light of the above teachings. It is therefore understood that within the scope of the appended claims, the invention may be practiced otherwise than as specifically described herein.

What is claimed is:

1. In combination with an A.C. protective relay system an apparatus for inspecting the A.C. electric protective relay system during the operation thereof, said protective relay system having at least one switching transistor element therein, comprising:

a first pulse train generator emitting in operating signals of a higher frequency than that of an actual signal applied as an input of said relay system upon the occurrence of a fault that the relay system is to detect, a second pulse train generator emitting in operation, pulses of the same frequency as the first pulse train generator, a pair of ring-modulators each separately modulating the first and second pulse trains with an A.C. voltage signal simulative of an input that would be applied to the relay system during actual operating conditions, means for combining the modulated pulse trains emitted from the pair of modulators into a third pulse train in which each of the pulses within one of the first or second pulse trains is located between the successive pulses within the other pulse train, said first and second pulse train generators including means for regulating the width of each pulse emitted therefrom so that an extremely small time interval exists between the successive pulses within the third pulse train, and means for applying the modulated third pulse train onto the signal input of the relay without any leakage of the modulated pulses in the third pulse train in a direction toward a signal from a source indicative of an actual fault that the relay system is to detect would come from.

2. The combination according to claim 1, wherein:

said first and second pulse train generators each comprise a uni-multivibrator, each having time constants which are selected so that an extremely small time interval is provided between successive pulses within said modulated third pulse train.

3. The combination according to claim 1, wherein: said protective relay system to be inspected further includes circuit means for measuring the phase differences between voltages and electric currents in an A.C. electric circuit to be protected upon occurrence of faults in a circuit to be protected, and a common A.C. oscillator for generating output signals having both positive and negative half waveforms and synchronized with the A.C. voltages in the circuit to be protected, means connecting said A.C. oscillator with said first and second pulse train generators so that the positive half waveforms of the oscillator drive one of said pulse train generators and the negative half waveforms of the same oscillator drive the other pulse train generator.

4. The combination according to claim 2, wherein:

said protective relay system to be inspected further includes circuit means for measuring amplitude variations in an electric quantity from a predetermined amplitude, and means comprising an A.C. oscillator for generating output signals having both positive and negative half waveforms and combining them with said first and second pulse train generators so that the positive half waveforms of the output signals of the oscillator drive one of said pulse train generators and the negative half waveforms of the same oscillator drive the other pulse train generator.

5. The combination according to claim 1, wherein:

said protective relay system to be inspected further includes means for compensating at an input thereof to substantially reduce the time intervals between the successive pulses in said third pulse train to thereby prevent said switching transistor element of the relay system from misoperating by improperly turning on and off.

6. The combination according to claim 1, wherein:

said protective relay system comprises means detecting variations in internal impedances of an electric installation.

7. The combination according to claim 1, wherein:

low pass filter means is further included connected between an electrical source activated in the presence of a fault in an A.C. electric circuit to be protected by said protective relay system, said source having a commercial frequency and connected to apply a signal input to the protective relay system, and means connecting the output of said pair of ring-modulators between the low pass filter and the input of the protective relay system to be inspected.

* * * * *